(12) United States Patent
Pulvirenti et al.

(10) Patent No.: US 6,791,212 B2
(45) Date of Patent: Sep. 14, 2004

(54) HIGH-EFFICIENCY REGULATED VOLTAGE-BOOSTING DEVICE

(75) Inventors: Francesco Pulvirenti, Acireale (IT); Gregorio Bontempo, Acireale (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 20 days.

(21) Appl. No.: 10/260,717

(22) Filed: Sep. 27, 2002

(65) Prior Publication Data

US 2003/0080955 A1 May 1, 2003

(30) Foreign Application Priority Data

Sep. 28, 2001 (EP) .............................................. 01830613

(51) Int. Cl.⁷ .............................. H01H 31/10; G05F 1/10
(52) U.S. Cl. ...................... 307/113; 307/10.1; 327/536; 363/59
(58) Field of Search .............................. 363/59, 60, 61, 363/101; 307/113, 10.1, 296.1, 296, 110, 109; 327/536, 537, 148, 157, 538, 540

(56) References Cited

U.S. PATENT DOCUMENTS

| | | | | |
|---|---|---|---|---|
| 4,099,073 A | * | 7/1978 | Hashimoto et al. | 327/434 |
| 4,634,956 A | * | 1/1987 | Davis et al. | 323/222 |
| 5,627,459 A | * | 5/1997 | Itoyama et al. | 323/283 |
| 5,745,354 A | * | 4/1998 | Raza | 363/60 |
| 5,889,428 A | * | 3/1999 | Young | 327/536 |
| 6,326,959 B1 | | 12/2001 | Tanaka | 345/211 |

FOREIGN PATENT DOCUMENTS

| | | |
|---|---|---|
| FR | 2 724 468 | 3/1996 |
| JP | 10-319368 | 12/2001 |

* cited by examiner

*Primary Examiner*—Rajnikant B. Patel
(74) *Attorney, Agent, or Firm*—Lisa K. Jorgenson; Robert Iannucci; Seed IP Law Group PLLC

(57) ABSTRACT

A regulated voltage-boosting device provides a charge-pump circuit, which has an input terminal receiving a first voltage and an output terminal supplying a second voltage higher than the first voltage. The regulated voltage-boosting device provides a plurality of voltage-boosting stages that can be selectively activated and deactivated. The regulated voltage-boosting device provides an automatic-selection circuit for activating a number of voltage-boosting stages which is correlated to the first voltage and to the second voltage.

33 Claims, 3 Drawing Sheets

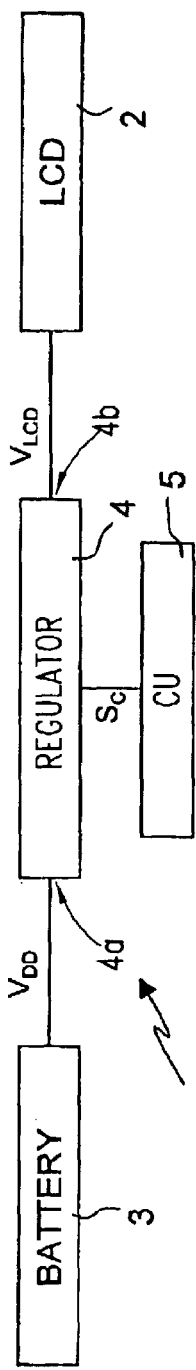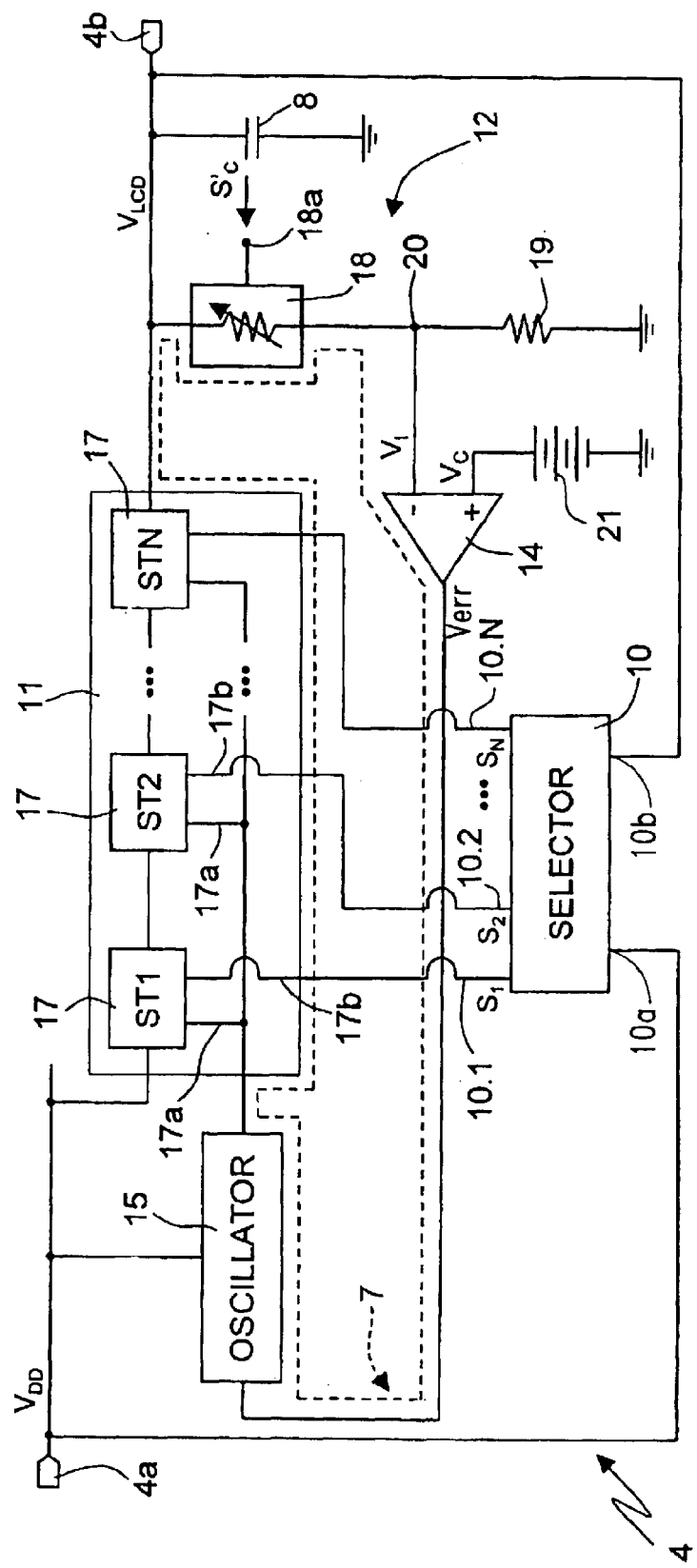

HIGH-EFFICIENCY REGULATED VOLTAGE-BOOSTING DEVICE

BACKGROUND OF THE INVENTION

1. Field of the Invention

The present invention relates to a high-efficiency regulated voltage-boosting device which may be used in particular for driving liquid-crystal displays (LCDs).

2. Description of the Related Art

As is known, regulated voltage boosters are used when it is necessary to supply one part of a circuit or device with a boosted voltage higher than the normal supply voltage. These regulated voltage boosters are based upon charge-pump circuits which comprise a preset number of voltage-boosting stages with negative feedback. In particular, the number of voltage-boosting stages required, which defines the multiplication factor of the charge pump, depends upon the ratio between the supply voltage and the boosted voltage that it is necessary to obtain. The number of voltage-boosting stages must moreover be chosen in such a way that the nominal voltage levels are guaranteed even in the worst operating conditions. In many cases, in fact, the ratio between the supply voltage and the boosted voltage is not constant, but varies in time. For example, it is known that in battery-supplied devices, the supply voltage may fluctuate and tends to decrease even to a considerable extent as the battery charge runs out. Consequently, in case of operation with low battery charge, a higher multiplication factor is required than in case of fully charged battery.

In known regulated voltage boosters, on the other hand, when the charge-pump circuit is activated for regulating the boosted voltage, all the voltage-boosting stages are in any case operated simultaneously, irrespective of the operating conditions.

The above is clearly disadvantageous, since the efficiency is considerably penalized, above all when the boosted regulator operates in nominal conditions (in which a low multiplication factor is sufficient).

For greater clarity, reference is made to the example of a boosted regulator for driving LCDs, in which a lithium battery supplies a supply voltage $V_{DD}$ ranging between 2.8 V and 4.2 V. The required driving voltage $V_{LCD}$ depends upon the number of rows present in the display and is normally higher than the supply voltage, for instance $V_{LCD}$ (12 V). In the worst conditions ($V_{DD}$=2.8 V), the multiplication factor M of the charge pump must be at least 5. In fact, in this case we have $V_{LCD}=V_{DD}*M=2.8*5=14$ V. Since M (1 voltage-boosting stages are required, in general, in order to reach a multiplication factor equal to M, the charge pump of the example must comprise four stages. However, most of the time the regulated voltage booster is operated in conditions close to the nominal conditions, in which $V_{DD}$= 4.2 V. In this case, a multiplication factor M equal to 3 is enough; in fact we have $V_{LCD}=V_{DD}*M=4.2*3=12.6$ V. In practice, just two voltage-boosting stages would normally be sufficient, but in order to meet a greater variety of operative conditions, four stages must be provided which are all actuated whenever the charge pump intervenes. As already mentioned, this entails considerable power consumption, and hence a low level of efficiency.

BRIEF SUMMARY OF THE INVENTION

An embodiment of the present invention provides a regulated voltage booster that has dynamic allocation of boost voltage and, in particular, ensures high levels of efficiency.

According to an embodiment of the present invention, a regulated voltage booster and a method for controlling a regulated voltage-boosting device are provided. The regulated voltage-boosting device includes a charge-pump circuit, which has an input terminal for receiving a first voltage ($V_{DD}$) and an output terminal for supplying a second voltage ($V_{LCD}$) higher than the first voltage ($V_{DD}$). The device provides a plurality of voltage-boosting stages that can be selectively activated and deactivated. The device includes an automatic-selection circuit for activating a number of the voltage-boosting stages, which is correlated to the existing operating conditions. Also, the method controls a regulated voltage-boosting device having a charge-pump circuit to provide a plurality of voltage-boosting stages which can be selectively activated and deactivated. The method including steps of supplying a first voltage ($V_{DD}$) to the charge-pump circuit; generating a second voltage ($V_{LCD}$) higher than the first voltage ($V_{DD}$) such that the activation of a number (M) of the voltage-boosting stages is correlated to existing operating conditions of the device.

BRIEF DESCRIPTION OF THE SEVERAL VIEWS OF THE DRAWINGS

For a better understanding of the present invention, an embodiment thereof is now described, purely by way of non-limiting example, with reference to the attached drawings, in which:

FIG. 1 illustrates a simplified block diagram of a user device supplied by means of a regulated voltage-boosting device;

FIG. 2 illustrates a block diagram of a regulated voltage-boosting device, built according to the present invention;

DETAILED DESCRIPTION OF THE INVENTION

Figure 3:
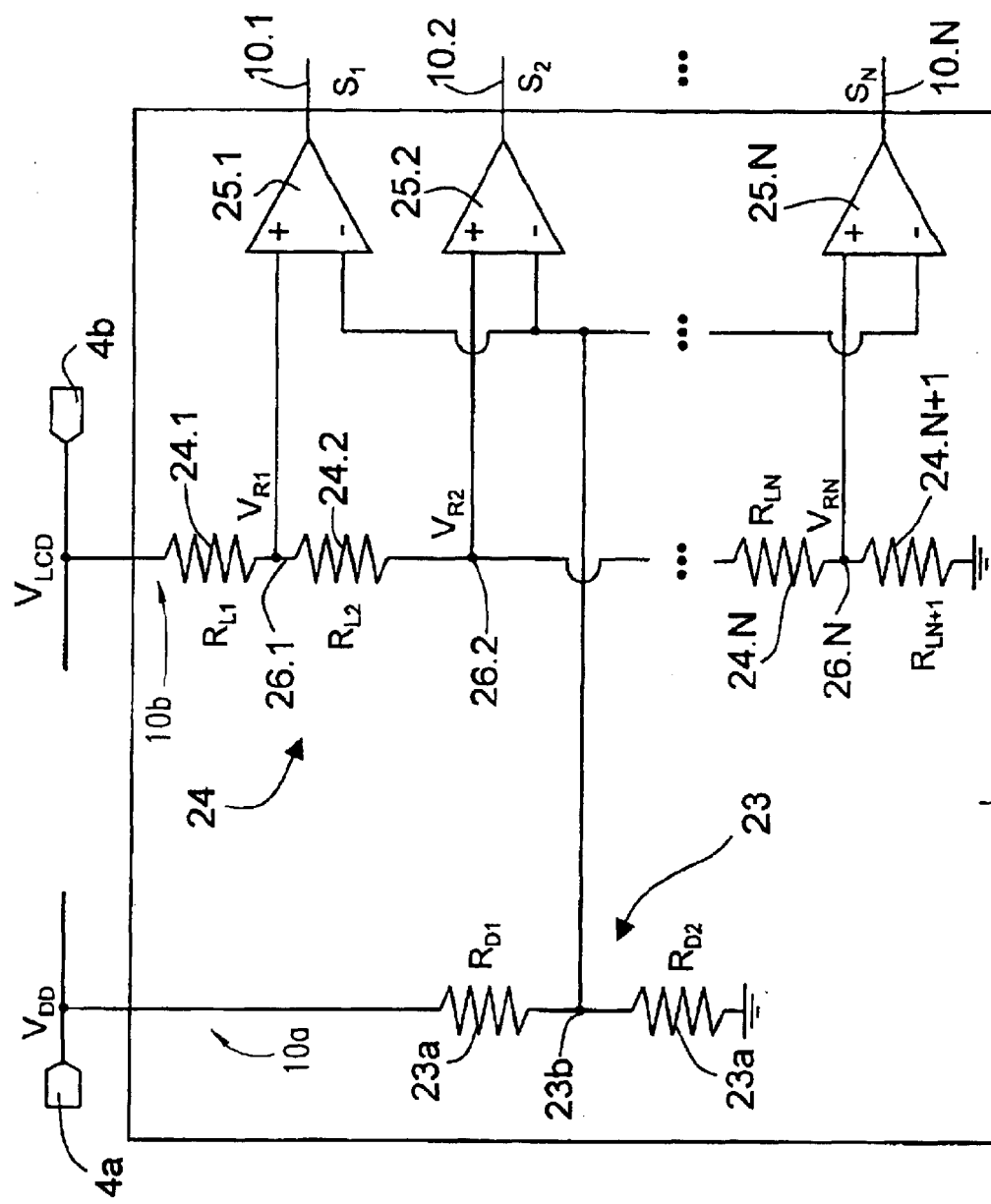
FIG. 3 illustrates a more detailed circuit diagram of a first block of the diagram of FIG. 2.

The present invention can be advantageously used in a wide range of applications, among which the driving of battery-supplied portable devices, such as LCDs for cell phones or palmtop electronic computers. For reasons of convenience, hereinafter particular reference will be made to this type of use, without, however, the possibility of this being considered in any way limiting.

As shown in FIG. 1, a display device 1 comprises a liquid-crystal display 2, a battery 3, a regulated voltage booster 4, and a control unit 5. The regulated voltage booster 4 has an input terminal 4a which is connected to an output of the battery 3, supplying a supply voltage $V_{DD}$, for example of between 2.8 V and 4.2 V, and an output terminal 4b which is connected to an input of the display 2 and supplies a boosted voltage $V_{LCD}$ higher than the supply voltage; for instance, the boosted voltage $V_{LCD}$ is equal to 12 V. In particular, the liquid-crystal display 2 comprises a plurality of rows and columns, each of which is supplied by a respective driving circuit (known and not illustrated) which receives the boosted voltage $V_{LCD}$. In addition, the regulated voltage booster 4 is connected to the control unit 5, which generates and supplies control signals $S_C$ in a known manner.

With reference to FIG. 2, the regulated voltage booster 4 comprises a regulation loop 7, a filter capacitor 8, and a selector circuit 10.

In greater detail, the regulation loop 7 comprises a charge pump 11, a regulation divider 12, an error amplifier 14, and an oscillator 15.

The charge pump 11 is provided with a plurality of voltage-boosting stages 17, which are cascaded together and are connected between the input terminal 4a and the output terminal 4b of the regulated voltage booster 4, for receiving the supply voltage $V_{DD}$ and supplying the boosted voltage $V_{LCD}$. In particular, denoting by N the number of stages 17, the charge pump 11 has a multiplication factor M which is variable and, in absolute terms, ranges from 2 to N+1. The stages 17 have respective timing inputs 17a and enabling inputs 17b. In detail, all the timing inputs 17a are connected to an output of the oscillator 15, which supplies a timing signal CK having a variable frequency $F_{CK}$, as explained hereinafter. The enabling inputs 17b are instead connected to respective outputs of the selector circuit 10.

The regulation divider 12 is connected between the output terminal 4b of the regulated voltage booster 4 and ground, and comprises a first regulation resistor 18 and a second regulation resistor 19, which are connected together and form an intermediate node 20, set at an intermediate voltage $V_I$ which is proportional to the boosted voltage $V_{LCD}$. Preferably, at least the first regulation resistor 18 has a programmable resistance value and has a control terminal 18a which receives a control signal $S'_C$ generated in a per se known manner by the control unit 5. Consequently, the dividing ratio of the regulation divider 12 can be modified for programming the steady-state condition value of the boosted voltage $V_{LCD}$.

The error amplifier 14 has an inverting input connected to the intermediate node 20, a non-inverting input connected to a voltage generator 21 which supplies a constant voltage $V_C$, and an output connected to a driving input of the oscillator 15 and supplying an error voltage $V_{ERR}$ correlated to the difference between the constant voltage $V_C$ and the intermediate voltage $V_I$.

The oscillator 15 which has a supply input connected to the input terminal 4a of the regulated voltage booster 4, is a voltage-controlled oscillator. In other words, the error voltage $V_{ERR}$ modulates the frequency $F_{CK}$ of the timing signal CK supplied by the oscillator 15 and sent to the timing inputs 17a of the stages 17 of the charge pump 11.

The selector circuit 10 has a first input 10a and a second input 10b which are respectively connected to the input terminal 4a and to the output terminal 4b of the regulated voltage booster 4. In addition, the selector circuit 10 has N outputs 10.1, 10.2, ..., 10.N, each of which is connected to the enabling terminal 17b of a respective voltage-boosting stage 17 of the charge pump 11, as mentioned previously. The N outputs 10.1, 10.2, ..., 10.N of the selector circuit 10 supply respective enabling signals $S_1, S_2, \ldots, S_N$ of a logic type, for alternatively enabling and disabling the respective stages 17, in a per se known manner. The enabling signals $S_1, S_2, \ldots, S_N$ have an enabling value (for example, high) and a disabling value (low), and are correlated to the ratio $V_{LCD}/V_{DD}$ between the boosted voltage $V_{LCD}$ on the output terminal 4b and the supply voltage $V_{DD}$ on the input terminal 4a of the regulated voltage booster 4, as explained hereinafter.

During operation of the regulated voltage booster 4, the regulation loop 7 maintains the boosted voltage $V_{LCD}$ close to its nominal value. For this purpose, the error amplifier 14 operates the oscillator 15 to eliminate the difference between the constant voltage $V_C$ and the intermediate voltage $V_I$ that are respectively present on the non-inverting input and on the inverting input of the error amplifier 14. In greater detail, when the intermediate voltage $V_I$ is lower than the constant voltage $V_C$, the error voltage $V_{ERR}$ causes an increase in the frequency $F_{CK}$ of the timing signal CK, and hence in the boosted voltage $V_{LCD}$. On the contrary, when the intermediate voltage $V_I$ exceeds the constant voltage $V_C$, the error voltage $V_{ERR}$ causes a decrease in the frequency $F_{CK}$ of the timing signal CK and in the boosted voltage $V_{LCD}$.

The selector circuit 10 detects the boosted voltage $V_{LCD}$ and the supply voltage $V_{DD}$, and according to the value of the ratio $V_{LCD/VDD}$ between said voltages, automatically determines the multiplication factor M of the charge pump 11, by enabling the number of stages 17 which minimizes the power absorbed by the charge pump 11.

When the supply voltage $V_{DD}$ supplied by the battery 3 is close to its nominal value (4.2 V), the value of the ratio $V_{LCD}/V_{DD}$ between the boosted voltage $V_{LCD}$ and the supply voltage $V_{DD}$ is minimum; in this case, the multiplication factor M is set at the minimum value required by the specific application. In particular, in the embodiment described we have $V_{LCD}/V_{DD}=12/4.2=2.86$, and hence the multiplication factor M must be equal to 3: two stages 17 of the charge pump 11 are enabled, whereas the other stages 17 are disabled and do not absorb power. As the ratio $V_{LCD}/V_{DD}$ between the boosted voltage $V_{LCD}$ and the supply voltage $V_{DD}$ increases i.e., as the supply voltage $V_{DD}$ decreases, an increasing number of stages 17 is enabled, so as to increase the multiplication factor M.

The structure and operation of the selector circuit 10 will be illustrated in greater detail hereinafter, with reference to FIG. 3.

In particular, the selector circuit 10 comprises a first sensing divider 23, a second sensing divider 24, and N comparators 25.1, 25.2, ..., 25.N, N being the number of stages of the charge pump 11.

The first sensing divider 23 is connected between the input terminal 4a of the regulated voltage booster 4 and ground, and comprises a pair of resistors 23a which have a common terminal 23b and have respective resistance values $R_{D1}, R_{D2}$. The voltage on the common terminal 23b is thus proportional to the supply voltage $V_{DD}$.

The second sensing divider 24 is connected between the output terminal 4b of the regulated voltage booster 4 and ground, and comprises N+1 resistors 24.1, 24.2, ..., 24.N+1 having respective resistance values $R_{L1}, R_{L2}, \ldots, R_{LN+1}$. In addition, the resistors 24.1, 24.2, ..., 24.N+1 of the second sensing divider 24 have, in pairs, common terminals, which define respective N reference nodes 26.1, 26.2, ..., 26.N.

The comparators 25.1, 25.2, ..., 25.N have inverting inputs connected together and to the common terminal 23b of the first sensing divider 23, non-inverting inputs, each of which is connected to a respective reference node 26.1, 26.2, ..., 26.N, and outputs, each of which defines a respective output 10.1, 10.2, ..., 10.N of the selector circuit 10 and supplies a respective enabling signal $S_1, S_2, \ldots, S_N$.

In practice, on the reference nodes 26.1, 26.2, ..., 26.N there are reference voltages $V_{R1}, V_{R2}, \ldots, V_{RN}$ which are equal to respective fractions of the boosted voltage $V_{LCD}$ and are comprised between a minimum value, present on the reference node 26.N, and a maximum value, present on the reference node 26.1.

Those comparators 25.1, 25.2, ..., 25.N which are connected to reference nodes 26.1, 26.2, ..., 26.N set at voltages lower than the voltage of the common terminal 23b have their respective outputs 10.1, 10.2, ..., 10.N at the low disabling value, and the corresponding stages 17 of the charge pump 11 are disabled; on the contrary, the remaining stages 17 are enabled. Clearly, the higher the value of the voltage $V_{DD}$ (and hence the lower the value of the ratio $V_{LCD}/V_{DD}$), the smaller the number of stages 17 of the charge pump 11 that are activated. Consequently, when the supply voltage $V_{DD}$ is close to its nominal value, the minimum number of stages 17 required for the specific application is activated (two, in the example of embodiment described); instead, when the battery 3 is almost completely run-down, i.e., when the supply voltage $V_{DD}$ reaches a minimum operating threshold (2.8 V in the example described), a greater number of stages 17 is activated for regulating the boosted voltage $V_{LCD}$.

In addition, in order to minimize in any possible operating condition the power absorbed by the charge pump 11, the resistance values of the resistors 23a, 23b and 24.1, 24.2, . . . , 24.N are linked together as described hereinafter, with reference also to FIG. 4 which illustrates a simplified diagram of the charge pump 11.

Figure 4:
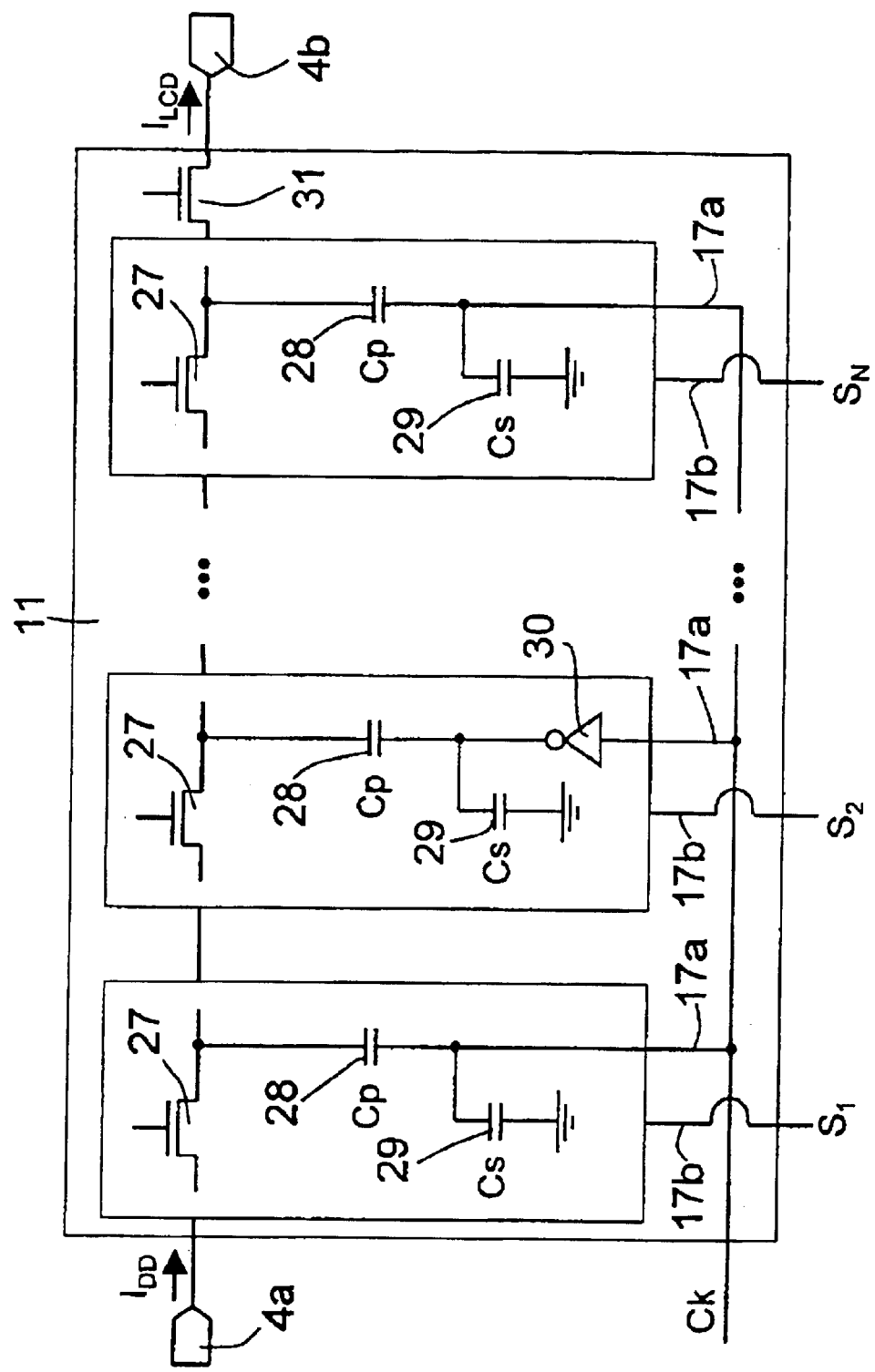
FIG. 4 illustrates a simplified circuit diagram of a second block of the diagram of FIG. 2.

In particular, FIG. 4 shows that each stage 17 comprises a switch 27, preferably formed by a MOS transistor, a pumping capacitor 28, which has a capacitance $C_P$, and a parasitic capacitor 29, which has a capacitance Cs and is connected between a terminal of the pumping capacitor 28 and ground. The ratio $C_P/C_S$ between the capacitances respectively of the pumping capacitor 28 and of the parasitic capacitor 29 depends upon the technology with which the components are built and is substantially known (for instance, $C_P/C_S$=0.1). In addition, the timing inputs 17a are connected to the respective pumping capacitors 28 directly in the stages 17 that occupy odd positions, and via an inverter 30 in the stages that occupy even positions.

FIG. 4 also shows an output transistor 31, connected in series to the stages 17 for decoupling them from the output terminal 4b, a supply current $I_{DD}$ entering the charge pump 11, and a boosting current $I_{LCD}$ leaving the charge pump 11. As is known to those skilled in the art, the supply current $I_{DD}$ is correlated to the power absorbed by the charge pump 11 and is linked to the boosting current $I_{LCD}$ by the following relation:

$$I_{DD}=(M-1)C_S V_{DD} F_{CK}+MI_{LCD} \qquad (1)$$

where M is the multiplication factor and $F_{CK}$ is the frequency of the timing signal CK supplied to the charge pump 11.

In addition, between the boosted voltage $V_{LCD}$ and the supply voltage $V_{DD}$ the following relation exists:

$$V_{LCD}=MV_{DD}-R_O I_{LCD} \qquad (2)$$

where $$R_O = \frac{M-1}{F_{CK}C_P} \qquad (3)$$

is the output resistance of the charge pump 11.

Combining relations (2) and (3), an expression of the frequency $F_{CK}$ is derived, which, when substituted into equation (1), yields the relation $$I_{DD} = \alpha(M-1)^2 \frac{VDD}{MV_{DD}-V_{LCD}} I_{LCD} + MI_{LCD} \qquad (4)$$

where $\alpha=C_P/C_S$.

Setting equal to zero the derivative of the supply current $I_{DD}$ with respect to the multiplication factor M, we obtain the following relation:

$$M = int\left[\frac{V_{LCD}}{V_{DD}} + \left(\frac{V_{LCD}}{V_{DD}}-1\right)\sqrt{\frac{\alpha}{1+\alpha}}\right]+1 \qquad (5)$$

In practice, relation (5) yields, according to the ratio $V_{LCD}/V_{DD}$, the value of the multiplication factor that minimizes power absorption by the charge pump 11.

When the ratio $V_{LCD}/V_{DD}$ is such that the voltage on the common terminal 23b is equal to the voltage present on a generic reference node 26.M ((i.e., when it is necessary to enable M stages 17 in order to obtain a multiplication factor M the following relation must hold:

$$V_{DD}\frac{R_{D2}}{R_{DT}} = V_{LCD}R_{LN} + R_{LN-1} + \ldots + \frac{R_{LM'}}{R_{LT}} \qquad (6)$$

where
$R_{DT}=R_{D1}+R_{D2}$
$R_{LT}=R_{L1}+R_{L2}+\ldots+R_{LN+1}$

In this way, in fact, the multiplication factor M satisfies relation (5), and from which is further found $$\frac{V_{LCD}}{V_{DD}} = \frac{M'-1+\sqrt{\frac{\alpha}{1+\alpha}}}{1+\sqrt{\frac{\alpha}{1+\alpha}}} \qquad (7)$$

Combining equations (6) and (7) we obtain the relation $$\frac{R_{LT}}{R_{LM'}+\ldots+R_{LN}+R_{LN+1}} = \frac{R_{D2}}{R_{DT}}\frac{M'-1+\sqrt{\frac{\alpha}{1+\alpha}}}{1+\sqrt{\frac{\alpha}{1+\alpha}}} \qquad (8)$$

The above relation must be valid for all the admissible values of the multiplication factor M, i.e., for M=(2, . . . , N+1).

In other words, in the selector circuit 10, the resistance values of the resistors 23a, 23b and 24.1, 24.2, . . . , 24.N satisfy the system of equations $$\frac{R_{LT}}{R_{L2}+R_{L3}+\ldots+R_{LN+1}} = \frac{R_{D2}}{R_{DT}}\frac{1+\sqrt{\frac{\alpha}{1+\alpha}}}{1+\sqrt{\frac{\alpha}{1+\alpha}}} = \frac{R_{D2}}{R_{DT}} \qquad (9)$$

$$\frac{R_{LT}}{R_{L3}+\ldots+R_{LN+1}} = \frac{R_{D2}}{R_{DT}}\frac{2+\sqrt{\frac{\alpha}{1+\alpha}}}{1+\sqrt{\frac{\alpha}{1+\alpha}}} \qquad (10)$$

...

$$\frac{R_{LT}}{R_{LN+1}} = \frac{R_{D2}}{R_{DT}}\frac{N+\sqrt{\frac{\alpha}{1+\alpha}}}{1+\sqrt{\frac{\alpha}{1+\alpha}}} \qquad (11)$$

The regulated voltage booster 4 according to the invention affords the advantages specified in what follows.

In the first place, the efficiency of the device is very high, in so far as, in any operating condition, the number of stages 17 of the charge pump 11 that optimizes power consumption of the charge pump itself is automatically activated. In particular, the overall number of stages 17 is sufficient for guaranteeing proper operation even in critical operating conditions, i.e., when the supply voltage $V_{DD}$ supplied by the battery 3 approaches the minimum values admissible. However, when the supply voltage $V_{DD}$ is close to its nominal value, only the stages 17 that are actually needed for obtaining the required boosted voltage $V_{LCD}$ are activated, whereas the remaining stages, which are disabled, do not absorb any power.

In addition, the design of user devices employing the regulated voltage booster 4 is simplified. In fact, it is not necessary to specify beforehand the number of stages 17 required, nor to store this number in the user device, since specifying the value of the boosted voltage $V_{LCD}$ is enough.

Finally, it is clear that modifications and variations may be made to the regulated voltage boosting device described herein, without thereby departing from the scope of the present invention.

In particular, the regulated voltage booster 4 can be used also for supplying a boosted voltage higher than the supply voltage also to devices other than LCDs. It can also be used when the supply voltage is supplied by a main power-supply line, possibly through a transformer, instead of by a battery.

Furthermore, the comparators 25.1, 25.2, ..., 25.N may be of the type with hysteresis. In this way, the selector circuit 10 has a higher immunity to noise, and it is possible to prevent undesired switching of the enabling signals $S_1$, $S_2$, ..., $S_N$ due to fast fluctuations of the supply voltage $V_{DD}$ All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A regulated voltage-boosting device comprising:
    a charge-pump circuit, which has an input terminal receiving a first voltage and an output terminal supplying a second voltage higher than said first voltage, and a first number of voltage-boosting stages that can be selectively activated and deactivated; and
    an automatic-selection circuit for activating a second number of said voltage-boosting stages which is correlated to existing operating conditions, the second number being any number comprised between one and the first number.

2. The device according to claim 1, wherein said operating conditions comprise said first voltage and said second voltage.

3. The device according to claim 2, wherein said automatic-selection circuit has a first input connected to said input terminal, a second input connected to said output terminal, and a plurality of outputs, each of which is connected to an enabling terminal of a respective voltage-boosting stage and supplies a respective enabling signal correlated to the ratio between said second voltage and said first voltage.

4. The device according to claim 3, wherein said automatic-selection circuit comprises a first divider, connected between said input terminal and a reference-potential line, a second divider, connected between said output terminal and said reference-potential line, and a plurality of comparators, connected to said first divider and said second divider.

5. The device according to claim 4, wherein said first divider comprises a pair of first resistors having respective first resistance values ($R_{D1}$, $R_{D2}$), and said second divider includes a plurality of second resistors having respective second resistance values ($R_{L1}$, $R_{L2}$, ..., $R_{LN+1}$), said first resistance values ($R_{D2}$, $R_{D2}$) and said second resistance values ($R_{L1}$, $R_{L2}$, ..., $R_{LN+1}$) being such as to satisfy the following system of equations:

$$\frac{R_{LT}}{R_{L2}+R_{L3}+\ldots+R_{LN+1}} = \frac{R_{D2}}{R_{DT}} \frac{1+\sqrt{\frac{\alpha}{1+\alpha}}}{1+\sqrt{\frac{\alpha}{1+\alpha}}} = \frac{R_{D2}}{R_{DT}}$$

$$\frac{R_{LT}}{R_{L3}+\ldots+R_{LN+1}} = \frac{R_{D2}}{R_{DT}} \frac{2+\sqrt{\frac{\alpha}{1+\alpha}}}{1+\sqrt{\frac{\alpha}{1+\alpha}}}$$

...

$$\frac{R_{LT}}{R_{LN+1}} = \frac{R_{D2}}{R_{DT}} \frac{N+\sqrt{\frac{\alpha}{1+\alpha}}}{1+\sqrt{\frac{\alpha}{1+\alpha}}}$$

where N is the number of voltage-boosting stages of said charge-pump circuit, $R_{DT}$ is equal to the sum of said first resistance values ($R_{D1}$, $R_{D2}$), $R_{LT}$ is equal to the sum of said second resistance values ($R_{L1}$, $R_{L2}$, ..., $R_{LN+1}$), and $\alpha$ is a process constant.

6. The device according to claim 4, wherein each of said comparators has an inverting input connected to a common terminal of said first divider, a non-inverting input connected to a respective reference node of said second divider, and an output forming a respective output of said selector circuit.

7. The device according to claim 6, wherein said comparators are comparators with hysteresis.

8. The device according to claim 1, further comprising a programming means for programming a steady-state value of said second voltage.

9. A display device comprising:
    a liquid-crystal display having an input receiving a regulated voltage;
    a battery having an output supplying a supply voltage;
    a regulated voltage booster having a first number of voltage boosting stages coupled in series, a first voltage boosting stage having an input terminal coupled to the output of the battery to receive the supply voltage, and a final voltage boosting stage having an output terminal coupled to the input of the liquid crystal display to provide a second voltage higher than the supply voltage, and each voltage-boosting stage having a select input to selectively activated and deactivated the voltage-boosting stage; and
    an automatic-selection circuit having a plurality of select outputs coupled respectively to the select input of the respective voltage-boosting stage for activating a second number of the voltage-boosting stages which is correlated to existing operating conditions the second number being any number comprised between one and the first number.

10. A method for controlling a regulated voltage-boosting device including a charge-pump circuit provided with a first number of voltage-boosting stages; which can be selectively activated and deactivated, the method comprising the steps of:

supplying a first voltage to said charge-pump circuit;
generating a second voltage higher than said first voltage; and
activating a second number of voltage-boosting stages correlated to existing operating condition, the second number being any number comprised between one and the first number.

11. The method according to claim 10, wherein said operating condition comprises said first voltage and said second voltage.

12. The method according to claim 10, further including the step of determining, according to the ratio between said second voltage and said first voltage, the number of voltage-boosting stages to be activated in order to minimize a current entering said charge-pump circuit.

13. The method according to claim 12, wherein said step of determining includes calculating said number M of voltage-boosting stages to be activated according to the equation $$M = int\left[\frac{V_{LCD}}{V_{DD}} + \left(\frac{V_{LCD}}{V_{DD}} - 1\right)\sqrt{\frac{\alpha}{1+\alpha}}\right] + 1$$

where M is the number of voltage-boosting stages to be activated and $\alpha$ is a process parameter.

14. The method according to claim 10, wherein said step of activating comprises:
detecting a voltage proportional to said first voltage;
generating a plurality of reference voltages equal to respective fractions of said second voltage; and
comparing said voltage proportional to said first voltage ($V_{DD}$) with said reference voltages.

15. The method according to claim 14, wherein said step of detecting includes forming a first fractional voltage from a first divider, and said step of generating said reference voltages ($V_{R1}, V_{R2}, \ldots, V_{RN}$) comprises forming a second fractional voltage from a second divider; said first divider comprising a pair of first resistors having respective first resistance values ($R_{D1}, R_{D2}$), and said second divider comprising a plurality of second resistors having respective second resistance values ($R_{L1}, R_{L2}, \ldots, R_{LN+1}$), said first resistance values ($R_{D1}, R_{D2}$) and said second resistance values ($R_{L1}, R_{L2}, \ldots, R_{LN+1}$) being such as to satisfy the following system of equations:

$$\frac{R_{LT}}{R_{L2} + R_{L3} + \ldots + R_{LN+1}} = \frac{R_{D2}}{R_{DT}} \frac{1 + \sqrt{\frac{\alpha}{1+\alpha}}}{1 + \sqrt{\frac{\alpha}{1+\alpha}}} = \frac{R_{D2}}{R_{DT}}$$

$$\frac{R_{LT}}{R_{L3} + \ldots + R_{LN+1}} = \frac{R_{D2}}{R_{DT}} \frac{2 + \sqrt{\frac{\alpha}{1+\alpha}}}{1 + \sqrt{\frac{\alpha}{1+\alpha}}}$$

$$\ldots$$

$$\frac{R_{LT}}{R_{LN+1}} = \frac{R_{D2}}{R_{DT}} \frac{N + \sqrt{\frac{\alpha}{1+\alpha}}}{1 + \sqrt{\frac{\alpha}{1+\alpha}}}$$

where N is the number of voltage-boosting stages of said charge-pump circuit, $R_{DT}$ is equal to the sum of said first resistance values ($R_{D1}, R_{D2}$), and $R_{LT}$ is equal to the sum of said second resistance values ($R_{L1}, R_{L2}, \ldots, R_{LN+1}$), and $\alpha$ is a process parameter.

16. A regulator device comprising:
a first voltage supply having an output providing a supply voltage;
a load circuit having an input;
a voltage conditioner circuit having a timing input and a first number of select inputs, a supply input coupled to the output of the first voltage supply to receive the supply voltage and an output coupled to the input of the load circuit to provide a regulated voltage;
a first control circuit coupled between the supply input of the voltage conditioner circuit and the output of the voltage conditioner circuit to provide a timing signal to the timing input of the voltage conditioner circuit, the timing signal having a frequency dependent upon a ratio of the regulated voltage to the supply voltage; and
a second control circuit coupled between the supply input of the voltage conditioner circuit and the output of the voltage conditioner circuit and having a first number of select outputs being coupled respectively to the first number of select inputs of the voltage conditioner circuit for providing enabling signals at a second number of the select outputs such that power absorbed by the voltage conditioner is a minimum, the second number being any number comprised between one and the first number.

17. The regulator device of claim 16, wherein the voltage conditioner circuit further includes a plurality of charge pump circuits coupled in series to receive an output voltage of an output of a preceding charge pump circuit such that succeeding charge pump circuits provide a succeeding voltage greater than the supply voltage.

18. The regulator device of claim 17, wherein each charge pump circuit of the plurality of charge pump circuits is coupled to receive the timing signal and to generate the succeeding voltage in proportion to the frequency of the signal.

19. The regulator device of claim 17, wherein each charge pump circuit includes first and second capacitors coupled in series between a second voltage supply and the output of the charge pump circuit, and a switch coupled between an output of a prior charge pump circuit and an input of a succeeding charge pump circuit.

20. The regulator device of claim 16, wherein the second control circuit further includes first and second voltage divider branches, and a compare circuit wherein the compare circuit has a first input coupled to the first divider branch, a second input coupled to the second branch, and an output to indicate a voltage condition between the regulated voltage at the output of the voltage conditioner and the first voltage at the first input of the voltage conditioner circuit.

21. The regulator device of claim 18, wherein the first control circuit comprises a variable resistor having a control input coupled to a control signal, and a biasing resistor coupled between ground and a terminal of the variable resistor.

22. A method of regulating an output voltage of a regulator device, comprising:
applying an input voltage to the regulator device;
forming a first number of intermediate voltages from the input voltage such that an output voltage of the regulator device is formed that is different from the input voltage;
generating a feedback signal proportional to a voltage difference of the output voltage to a reference voltage and using the feedback signal to determine an intermediate voltage of the first number of intermediate voltages;

generating a first set of fractional voltages proportional to the output voltage of the regulator device;

generating a second set of fractional voltages proportional to the input voltage of the regulator device;

comparing the first set of fractional voltages to the second set of fractional voltages to form a second number of select signals, the second number being any number comprised between one and the first number; and selectively generating the intermediate voltages to alter the output voltage of the regulator device based on the second number of select signals.

23. The method of regulating a voltage of claim 22, wherein generating the first feedback signal includes comparing a fractional voltage of the output voltage to a reference voltage such that an error voltage is formed.

24. The method of regulating a voltage of claim 22, wherein generating the second feedback signal includes enabling a charge pump to provide the intermediate voltage of the first number of intermediate voltages to the output voltage of the regulator device.

25. The method of regulating a voltage of claim 22, wherein the first feedback signal is a signal having a frequency proportional to the voltage difference.

26. A regulated voltage-boosting device comprising:

a charge-pump circuit, which has an input terminal receiving a first voltage and an output terminal supplying a second voltage higher than said first voltage, and a plurality of voltage-boosting stages that can be selectively activated and deactivated; and an automatic-selection circuit for activating a number of said voltage-boosting stages which is correlated to existing operating conditions, wherein the automatic-selection circuit comprises a first divider connected between said input terminal and a reference-potential line, a second divider connected between said output terminal and said reference-potential line, and a plurality of comparators connected to said first divider and said second divider, wherein said first divider comprises a pair of first resistors having respective first resistance values ($R_{D1}$, $R_{D2}$), and said second divider includes a plurality of second resistors having respective second resistance values ($R_{L1}$, $R_{L2}$, ..., $R_{LN+1}$), said first resistance values ($R_{D1}$, $R_{D2}$) and said second resistance values ($R_{L1}$, $R_{L2}$, ..., $R_{LN+1}$) being such as to satisfy the following system of equations:

$$\frac{R_{LT}}{R_{L2} + R_{L3} + \ldots + R_{LN+1}} = \frac{R_{D2}}{R_{DT}} \frac{1 + \sqrt{\frac{\alpha}{1+\alpha}}}{1 + \sqrt{\frac{\alpha}{1+\alpha}}} = \frac{R_{D2}}{R_{DT}}$$

$$\frac{R_{LT}}{R_{L3} + \ldots + R_{LN+1}} = \frac{R_{D2}}{R_{DT}} \frac{2 + \sqrt{\frac{\alpha}{1+\alpha}}}{1 + \sqrt{\frac{\alpha}{1+\alpha}}}$$

...

$$\frac{R_{LT}}{R_{LN+1}} = \frac{R_{D2}}{R_{DT}} \frac{N + \sqrt{\frac{\alpha}{1+\alpha}}}{1 + \sqrt{\frac{\alpha}{1+\alpha}}}$$

where N is the number of voltage-boosting stages of said charge-pump circuit, $R_{DT}$ is equal to the sum of said first resistance values ($R_{D1}$, $R_{D2}$), $R_{LT}$ is equal to the sum of said second resistance values ($R_{L1}$, $R_{L2}$, ..., $R_{LN+1}$), and $\alpha$ is a process constant.

27. The device according to claim 26, wherein said operating conditions comprise said first voltage and said second voltage.

28. The device according to claim 27, wherein said automatic-selection circuit has a first input connected to said input terminal, a second input connected to said output terminal, and a plurality of outputs, each of which is connected to an enabling terminal of a respective voltage-boosting stage and supplies a respective enabling signal correlated to the ratio between said second voltage and said first voltage.

29. A regulated voltage-boosting device comprising:

a charge-pump circuit, which has an input terminal receiving a first voltage and an output terminal supplying a second voltage higher than said first voltage, and a plurality of voltage-boosting stages that can be selectively activated and deactivated; and an automatic-selection circuit for activating a number of said voltage-boosting stages which is correlated to existing operating conditions, wherein the automatic-selection circuit comprises a first divider connected between said input terminal and a reference-potential line, a second divider connected between said output terminal and said reference-potential line, and a plurality of comparators connected to said first divider and said second divider, wherein each of said comparators has an inverting input connected to a common terminal of said first divider, a non-inverting input connected to a respective reference node of said second divider, and an output forming a respective output of said selector circuit.

30. The device according to claim 29, wherein said operating conditions comprise said first voltage and said second voltage.

31. The device according to claim 30, wherein said automatic-selection circuit has a first input connected to said input terminal, a second input connected to said output terminal, and a plurality of outputs, each of which is connected to an enabling terminal of a respective voltage-boosting stage and supplies a respective enabling signal correlated to the ratio between said second voltage and said first voltage.

32. A method for controlling a regulated voltage-boosting device including a charge-pump circuit provided with a plurality of voltage-boosting stages which can be selectively activated and deactivated, the method comprising the steps of:

supplying a first voltage to said charge-pump circuit;

generating a second voltage higher than said first voltage;

activating a number of voltage-boosting stages correlated to existing operating condition; and determining, according to the ratio between said second voltage and said first voltage, the number of voltage-boosting stages to be activated in order to minimize a current entering said charge-pump circuit, wherein said step of determining includes calculating said number of voltage-boosting stages to be activated according to the equation $$M = int\left[\frac{V_{LCD}}{V_{DD}} + \left(\frac{V_{LCD}}{V_{DD}} - 1\right)\sqrt{\frac{\alpha}{1+\alpha}}\right] + 1$$

where M is the number of voltage-boosting stages to be activated and $\alpha$ is a process parameter.

33. A method for controlling a regulated voltage-boosting device including a charge-pump circuit provided with a plurality of voltage-boosting stages which can be selectively activated and deactivated, the method comprising the steps of:
supplying a first voltage to said charge-pump circuit;
generating a second voltage higher than said first voltage; and
activating a number of voltage-boosting stages correlated to existing operating condition, wherein said step of activating comprises:
detecting a voltage proportional to said first voltage;
generating a plurality of reference voltages equal to respective fractions of said second voltage; and
comparing said voltage proportional to said first voltage ($V_{DD}$) with said reference voltages,
wherein said step of detecting includes forming a first fractional voltage from a first divider, and said step of generating said reference voltages ($V_{R1}, V_{R2}, \ldots, V_{RN}$) comprises forming a second fractional voltage from a second divider; said first divider comprising a pair of first resistors having respective first resistance values ($R_{D1}, R_{D2}$), and said second divider comprising a plurality of second resistors having respective second resistance values ($R_{L1}, R_{L2}, \ldots, R_{LN+1}$), said first resistance values ($R_{D1}, R_{D2}$) and said second resistance values ($R_{L1}, R_{L2}, \ldots, R_{LN+1}$) being such as to satisfy the following system of equations:

$$\frac{R_{LT}}{R_{L2}+R_{L3}+\ldots+R_{LN+1}} = \frac{R_{D2}}{R_{DT}}\frac{1+\sqrt{\frac{\alpha}{1+\alpha}}}{1+\sqrt{\frac{\alpha}{1+\alpha}}} = \frac{R_{D2}}{R_{DT}}$$

$$\frac{R_{LT}}{R_{L3}+\ldots+R_{LN+1}} = \frac{R_{D2}}{R_{DT}}\frac{2+\sqrt{\frac{\alpha}{1+\alpha}}}{1+\sqrt{\frac{\alpha}{1+\alpha}}}$$

...

$$\frac{R_{LT}}{R_{LN+1}} = \frac{R_{D2}}{R_{DT}}\frac{N+\sqrt{\frac{\alpha}{1+\alpha}}}{1+\sqrt{\frac{\alpha}{1+\alpha}}}$$

where N is the number of voltage-boosting stages of said charge-pump circuit, $R_{DT}$ is equal to the sum of said first resistance values ($R_{D1}, R_{D2}$), and $R_{LT}$ is equal to the sum of said second resistance values ($R_{L1}, R_{L2}, \ldots, R_{LN+1}$), and a is a process parameter.

* * * * *

UNITED STATES PATENT AND TRADEMARK OFFICE
CERTIFICATE OF CORRECTION

PATENT NO.   : 6,791,212 B2
DATED        : September 14, 2004
INVENTOR(S)  : Francesco Pulvirenti et al.

It is certified that error appears in the above-identified patent and that said Letters Patent is hereby corrected as shown below:

<u>Column 8,</u>
Line 60, "existing operating conditions" should read as -- existing operating conditions, --.
Line 65, "voltage-boosting stages," should read -- voltage-boosting stages --.

Signed and Sealed this

Twenty-third Day of August, 2005

JON W. DUDAS
*Director of the United States Patent and Trademark Office*